United States Patent
Kurokawa

(10) Patent No.: US 9,086,760 B2
(45) Date of Patent: Jul. 21, 2015

(54) DISPLAY DEVICE

(75) Inventor: Yoshiyuki Kurokawa, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 350 days.

(21) Appl. No.: 12/950,151

(22) Filed: Nov. 19, 2010

(65) Prior Publication Data

US 2011/0122098 A1    May 26, 2011

(30) Foreign Application Priority Data

Nov. 20, 2009  (JP) ................. 2009-264625

(51) Int. Cl.
  *G06F 3/042* (2006.01)
  *G06F 3/041* (2006.01)
  *G09G 3/20* (2006.01)

(52) U.S. Cl.
  CPC .............. *G06F 3/042* (2013.01); *G06F 3/0412* (2013.01); *G09G 3/20* (2013.01)

(58) Field of Classification Search
  USPC ......... 345/104, 207, 156, 173, 175, 176, 178; 178/18.01–18.03, 18.09, 18.11
  See application file for complete search history.

(56) References Cited

U.S. PATENT DOCUMENTS

| | | | |
|---|---|---|---|
| 5,264,940 A | 11/1993 | Komiya et al. | |
| 5,335,075 A | 8/1994 | Komiya et al. | |
| 6,339,215 B1 | 1/2002 | Yonemoto et al. | |
| 6,674,470 B1 | 1/2004 | Tanaka et al. | |
| 6,747,638 B2 | 6/2004 | Yamazaki et al. | |
| 6,867,811 B2 | 3/2005 | Nakamura et al. | |
| 6,879,344 B1 | 4/2005 | Nakamura et al. | |
| 6,888,571 B1 | 5/2005 | Koshizuka et al. | |
| 7,061,014 B2 | 6/2006 | Hosono et al. | |
| 7,064,346 B2 | 6/2006 | Kawasaki et al. | |
| 7,113,213 B2 | 9/2006 | Matsunaga et al. | |
| 7,123,243 B2 | 10/2006 | Kawasaki et al. | |
| 7,158,129 B2 | 1/2007 | Nakajima | |
| 7,282,782 B2 | 10/2007 | Hoffman et al. | |
| 7,323,356 B2 | 1/2008 | Hosono et al. | |
| 7,522,149 B2 | 4/2009 | Nakamura et al. | |

(Continued)

FOREIGN PATENT DOCUMENTS

CN     001424639 A    6/2003
CN     101430624 A    5/2009

(Continued)

OTHER PUBLICATIONS

Search Report, European Application No. 10191793.8, dated Jul. 18, 2011, 6 pages.

(Continued)

*Primary Examiner* — Charles V. Hicks
*Assistant Examiner* — Jeffrey Steinberg
(74) *Attorney, Agent, or Firm* — Fish & Richardson P.C.

(57) ABSTRACT

A purpose is to enable detection of an object in a display device including a display panel provided with photosensors when the object touches the display panel and when the object does not touch the display panel. A display device includes a display panel provided with photosensors. The display device has a function of detecting an object with the photosensor when the object touches the display panel and when the object does not touch thereto. The display device has a function of changing the sensitivity of the photosensor varies depending on whether the object touches the display panel.

16 Claims, 12 Drawing Sheets

(56) References Cited

U.S. PATENT DOCUMENTS

| | | | |
|---|---|---|---|
| 7,525,523 | B2 | 4/2009 | Yamazaki et al. |
| 7,674,650 | B2 | 3/2010 | Akimoto et al. |
| 7,800,594 | B2 | 9/2010 | Nakamura et al. |
| 7,888,681 | B2 | 2/2011 | Yamazaki et al. |
| 7,999,259 | B2 | 8/2011 | Ikeda et al. |
| 8,154,532 | B2 | 4/2012 | Chou et al. |
| 8,164,577 | B2 | 4/2012 | Tsuzaki et al. |
| 8,217,914 | B2 | 7/2012 | Koshiyama et al. |
| 8,284,165 | B2 | 10/2012 | Koshiyama et al. |
| 8,390,578 | B2 | 3/2013 | Chino |
| 8,665,237 | B2 | 3/2014 | Koshiyama et al. |
| 8,802,462 | B2 | 8/2014 | Yamazaki |
| 2003/0076295 | A1* | 4/2003 | Nakajima ............... 345/156 |
| 2005/0219229 | A1 | 10/2005 | Yamaguchi |
| 2006/0103637 | A1 | 5/2006 | Yamaguchi et al. |
| 2006/0244107 | A1 | 11/2006 | Sugihara et al. |
| 2006/0262055 | A1 | 11/2006 | Takahara |
| 2007/0108446 | A1 | 5/2007 | Akimoto |
| 2007/0194379 | A1 | 8/2007 | Hosono et al. |
| 2008/0122798 | A1 | 5/2008 | Koshiyama et al. |
| 2009/0033850 | A1* | 2/2009 | Ishiguro et al. ............ 349/116 |
| 2009/0040174 | A1* | 2/2009 | Yamashita ............... 345/104 |
| 2009/0117364 | A1 | 5/2009 | Tsuchiya et al. |
| 2009/0122024 | A1 | 5/2009 | Nakamura et al. |
| 2009/0141004 | A1 | 6/2009 | Yamazaki |
| 2009/0141046 | A1* | 6/2009 | Rathnam et al. ............ 345/661 |
| 2009/0207194 | A1 | 8/2009 | Wang et al. |
| 2010/0039406 | A1* | 2/2010 | Lee et al. ............... 345/174 |
| 2010/0085331 | A1 | 4/2010 | Kurokawa et al. |
| 2010/0090996 | A1* | 4/2010 | Chou et al. ............... 345/207 |
| 2010/0141623 | A1 | 6/2010 | Nakanishi et al. |
| 2011/0122108 | A1 | 5/2011 | Kozuma et al. |
| 2011/0175871 | A1 | 7/2011 | Katoh et al. |
| 2011/0199349 | A1 | 8/2011 | Katoh |
| 2012/0013595 | A1 | 1/2012 | Murai et al. |
| 2012/0013650 | A1 | 1/2012 | Mizubuchi |
| 2014/0015742 | A1 | 1/2014 | Yamaguchi et al. |
| 2014/0152605 | A1 | 6/2014 | Koshiyama et al. |

FOREIGN PATENT DOCUMENTS

| | | | |
|---|---|---|---|
| CN | 101515213 | A | 8/2009 |
| EP | 1045577 | A | 10/2000 |
| EP | 1359499 | A2 | 11/2003 |
| EP | 2071435 | A | 6/2009 |
| EP | 2177946 | A | 4/2010 |
| JP | 2000-307958 | A | 11/2000 |
| JP | 2000331557 | A | 11/2000 |
| JP | 2000-358190 | A | 12/2000 |
| JP | 2001-292276 | A | 10/2001 |
| JP | 2003-131798 | A | 5/2003 |
| JP | 2003296022 | A | 10/2003 |
| JP | 2004318819 | A | 11/2004 |
| JP | 2005-122450 | A | 5/2005 |
| JP | 2005-301373 | A | 10/2005 |
| JP | 2005311542 | A | * 11/2005 |
| JP | 2006-127212 | A | 5/2006 |
| JP | 2006243927 | A | 9/2006 |
| JP | 2007-102154 | A | 4/2007 |
| JP | 2008-117371 | A | 5/2008 |
| JP | 2009-116769 | A | 5/2009 |
| JP | 2009-169394 | A | 7/2009 |
| JP | 2010-097608 | A | 4/2010 |
| TW | 200743011 | | 11/2007 |
| TW | 200802217 | | 1/2008 |
| TW | 200917492 | | 4/2009 |
| TW | 200937266 | | 9/2009 |
| TW | 200947377 | | 11/2009 |
| WO | 0135638 | A1 | 5/2001 |
| WO | WO 0135638 | A1 * | 5/2001 |

OTHER PUBLICATIONS

European Search Report (Application No. 10191841.5) dated Nov. 28, 2011, in English, 7 pages.

European Office Action (Application No. 10191793.8) dated Apr. 3, 2013, in English.

Chinese Office Action (Application No. 201010566756.4) Dated Aug. 13, 2014.

Taiwanese Office Action (Application No. 099137943) Dated Mar. 12, 2015.

* cited by examiner

DISPLAY DEVICE

BACKGROUND OF THE INVENTION

1. Field of the Invention

The present invention relates to a display device including a photosensor and a driving method of the display device. In particular, the present invention relates to a display device in which pixels each provided with a photosensor are arranged in matrix and to a driving method of the display device. Further, the present invention relates to an electronic device including the display device. In addition, the present invention relates to a semiconductor device and a driving method thereof.

2. Description of the Related Art

In recent years, a display device provided with a touch sensor has attracted attention. The display device provided with a touch sensor is called a touch panel, a touch screen, or the like (hereinafter referred to simply as a touch panel). Examples of the touch sensor include a resistive touch sensor, a capacitive touch sensor, and an optical touch sensor which are different in operation principle. With the touch sensor, an object (e.g., a pen and a finger) touching a display device can be detected. Therefore, data for controlling the display device can be input by the use of the touch sensor as an input device. In addition, a display device including an optical touch sensor can be also used as a contact area sensor (e.g., Patent Document 1).

Further, as an example of a device without a display panel, a semiconductor device such as an image sensor can be given.

REFERENCE

[Patent Document 1] Japanese Published Patent Application No. 2001-292276

SUMMARY OF THE INVENTION

In the case of a display device including such a touch sensor described above as an input device, a display panel of the display device keeps being touched by an object. Accordingly, the display panel is easily smudged and display quality might be deteriorated. Further, the mechanical strength needed for operating the display device is required. Furthermore, display device users are easily tired when the display panel of the display device is hard.

In view of the above problems, it is a purpose to make detection possible in both of the cases where an object touches a display panel and where an object does not touch the display panel.

An embodiment of the present invention is a display device including a display panel in which a photosensor is provided in a pixel. The display device has a function of detecting an object with the photosensor when the object touches the display panel and when the object does not touch the display panel. The display device has a function of changing the sensitivity of the photosensor depending on whether the object touches the display panel.

In addition, it is preferable that when the sensitivity is changed, the sensitivity of the photosensor in the case where an object does not touch the display panel be higher than that in the case where the object touches the display panel.

In order to change the sensitivity, voltage applied to the photosensor may be adjusted.

Alternatively, the photosensor includes a transistor and a photodiode which is electrically connected to a gate of the transistor, and the sensitivity of the photosensor may be changed by adjustment of voltage applied to the photodiode.

Alternatively, the sensitivity of the photosensor may be changed by adjustment of voltage applied between a source and a drain of the transistor.

Alternatively, the photosensor may have a function of performing reset operation, accumulating operation, and selecting operation, and the sensitivity of the photosensor may be changed by time for the accumulating operation which varies depending on whether the object touches a display panel. It is preferable that the above methods for changing the sensitivity be combined with each other.

Further, another embodiment of the present invention is a display device including a display panel in which a pixel is provided in a photosensor. The photosensor has a function of performing reset operation, accumulating operation, and selecting operation and a function of performing the reset operation both in the case where the object touches the display panel and in the case where the object does not touch the display panel.

A display device which has a function of detecting an object in the case where the object touches the display panel and the case where the object does not touch the display panel can be provided. Moreover, a display device in which a high-quality image of a contact object can be imaged at high speed and a contactless object can be detected at high speed can be provided.

DETAILED DESCRIPTION OF THE INVENTION

Figure 1:
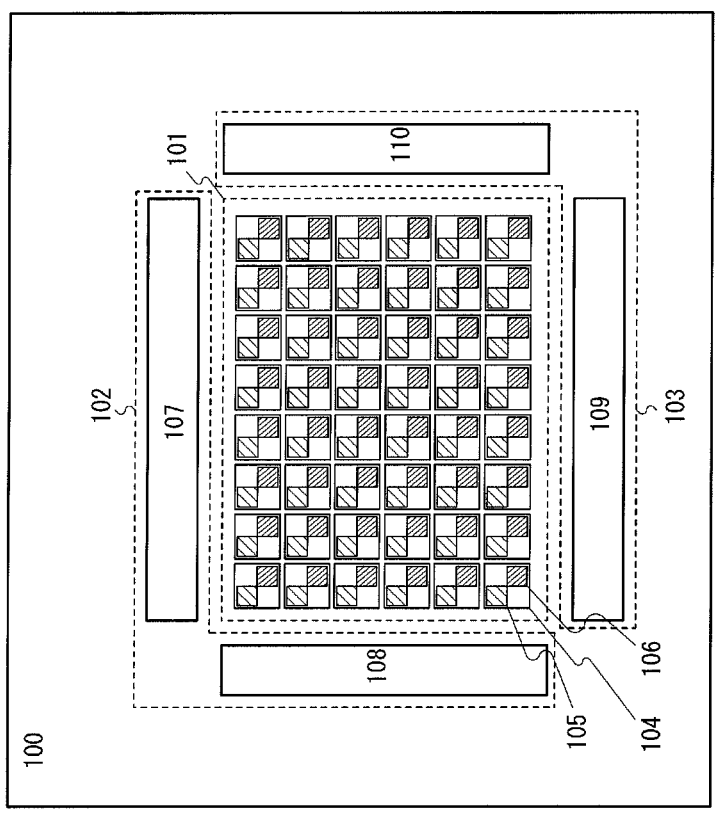
FIG. 1 is an explanatory diagram of a structure of a display device.

Hereinafter, embodiments will be described in detail with reference to the accompanying drawings. However, embodiments described below can be embodied in many different modes, and it is easily understood by those skilled in the art that the mode and the detail can be variously changed without departing from the spirit and the scope of the present invention. Therefore, the present invention should not be interpreted as being limited to the following description of the embodiments. In the drawings for describing the embodiments, the same parts or parts having a similar function are denoted by the same reference numerals, and description of such parts is not repeated.

Embodiment 1

In this embodiment, a display device is described with reference to FIG. 1, FIG. 2, FIG. 3, FIG. 4, FIG. 5, and FIG. 6.

The structure of a display panel will be described with reference to FIG. 1. A display panel 100 includes a pixel circuit 101, a display element control circuit 102, and a photosensor control circuit 103. The pixel circuit 101 includes a plurality of pixels 104 arranged in matrix of rows and columns. Each of the pixels 104 includes a display element 105 and a photosensor 106. Note that the photosensor 106 may be provided outside the pixel 104. Further, the number of photosensors 106 may be different from that of display elements 105.

Each of the display elements 105 includes a thin film transistor (TFT), a storage capacitor, a liquid crystal element, and the like. The thin film transistor has a function of controlling injection or discharge of charge to/from the storage capacitor. The storage capacitor has a function of holding charge which corresponds to voltage applied to the liquid crystal element. Whether light is transmitted or not is controlled by voltage applied to the liquid crystal element, so that grayscale is displayed. Light which a light source (a backlight) emits from the rear side of a liquid crystal display device is used as the light which passes through the liquid crystal layer.

Note that the case where each of the display elements 105 includes a liquid crystal element is described above; however, other elements such as a light emitting element may be included. The light emitting element is an element in which the luminance is controlled by current or voltage. Specifically, a light emitting diode, an OLED (organic light emitting diode), and the like can be given.

The photosensor 106 includes a transistor and an element (also referred to as a light receiving element) which has a function of generating an electronic signal by receiving light. As the light receiving element, a photodiode or the like can be used. Note that light which the photosensor 106 receives is light emitted from inside (such as a backlight) of a display device and reflected off an object, external light or the like reflected off the object, light emitted from the object itself, or light which is external light shielded by the object (shade).

The display element control circuit 102 controls the display elements 105 and includes a display element driver circuit 107 which inputs a signal to the display elements 105 through signal lines (also referred to as source signal lines) such as video-data signal lines; and a display element driver circuit 108 which inputs a signal to the display elements 105 through scanning lines (also referred to as gate signal lines). For example, the display element driver circuit 108 connected to the scanning line has a function of selecting the display element included in the pixel placed in a particular row. In addition, the display element driver circuit 107 connected to the signal line has a function of applying a predetermined potential to the display element included in the pixel placed in a selected row. Note that in the display element to which the display element driver circuit 108 connected to the scanning line applies high potential, the thin film transistor is in a conducting state, so that the display element is supplied with charge from the display element driver circuit 107 connected to the signal line.

The photosensor control circuit 103 controls the photosensors 106 and includes a photosensor reading circuit 109 connected to the signal line such as a photosensor output signal line and a photosensor reference signal line and a photosensor driver circuit 110 connected to the scanning line. The photosensor driver circuit 110 connected to the scanning line has a function of performing reset operation and selecting operation on the photosensor 106 included in the pixel 104 placed in a particular row, which is described below. Further, the photosensor reading circuit 109 connected to the signal line has a function of extracting an output signal of the photosensor 106 included in the pixel in the selected row. Note that the photosensor reading circuit 109 connected to the signal line can have a structure in which an output of the photosensor, which is an analog signal, is extracted as an analog signal to the outside of the display device by an OP amplifier; or a structure in which the output is converted into a digital signal by an A/D converter circuit and then extracted to the outside of the display device.

Figure 2:
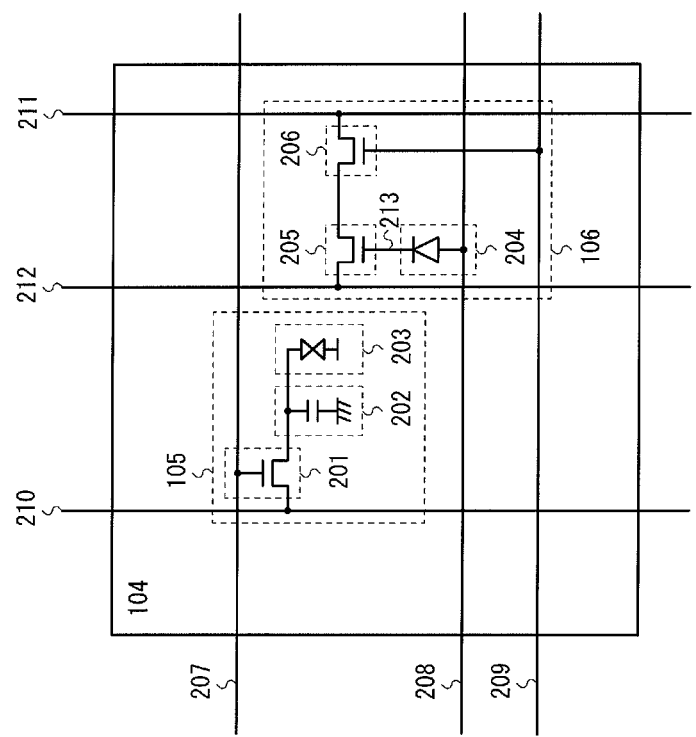
FIG. 2 is an explanatory diagram of a structure of a display device.

A circuit diagram of the pixel 104 will be described with reference to FIG. 2. The pixel 104 includes the display element 105 including a transistor 201, a storage capacitor 202, and a liquid crystal element 203, and the photosensor 106 including a photodiode 204, a transistor 205, and a transistor 206.

A gate of the transistor 201 is electrically connected to a gate signal line 207, one of a source and a drain of the transistor 201 is electrically connected to a video data signal line 210, and the other one of the source and the drain of the transistor 201 is electrically connected to one electrode of the storage capacitor 202 and one electrode of the liquid crystal element 203. The other electrode of the storage capacitor 202 and the other electrode of the liquid crystal element 203 are each held at a certain potential. The liquid crystal element 203 includes a pair of electrodes and a liquid crystal layer sandwiched between the pair of electrodes.

When "H" (high-level voltage) is applied to the gate signal line 207, the transistor 201 applies the potential of the video data signal line 210 to the storage capacitor 202 and the liquid crystal element 203. The storage capacitor 202 holds the applied potential. The liquid crystal element 203 changes light transmittance in accordance with the applied potential.

One electrode of the photodiode 204 is electrically connected to a photodiode reset signal line 208, and the other electrode of the photodiode 204 is electrically connected to a gate of the transistor 205. One of a source and a drain of the transistor 205 is electrically connected to a photosensor reference signal line 212, and the other of the source and the drain of the transistor 205 is electrically connected to one of a source and a drain of the transistor 206. A gate of the transistor 206 is electrically connected to a reading signal line 209, and the other of the source and the drain of the transistor 206 is electrically connected to a photosensor output signal line 211.

Figure 3:
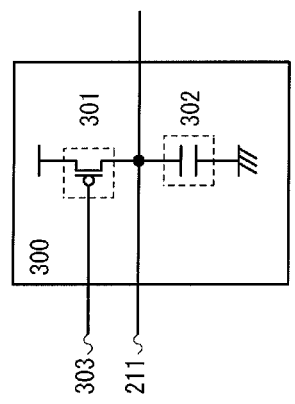
FIG. 3 is an explanatory diagram of a structure of a display device.

Next, the structure of the photosensor reading circuit 109 will be described with reference to FIG. 3. In FIG. 3, a photosensor reading circuit 300 for one column of pixels includes a p-channel transistor 301 and a storage capacitor 302. Further, the photosensor reading circuit 109 includes a photosensor output signal line 211 and a precharge signal line 303 which are for the one column of pixels.

In the photosensor reading circuit 300, the potential of the photosensor output signal line 211 is set to a reference potential before the operation of the photosensor in the pixel. In FIG. 3, by setting a potential of the precharge signal line 303 to "L" (low-level voltage), the potential of the photosensor output signal line 211 can be set to a high potential which is a reference potential. Note that it is acceptable that the storage capacitor 302 is not provided if the photosensor output signal line 211 has large parasitic capacitance. Note that the reference potential can also be a low potential. In that case, an n-channel transistor is used and the potential of the precharge signal line 303 is set to "H", whereby the potential of the photosensor output signal line 211 can be set to a low potential which is a reference potential.

Figure 4:
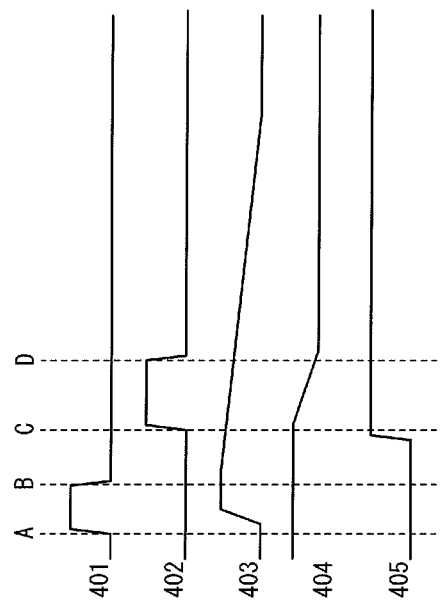
FIG. 4 is a timing chart.

Next, a reading operation of the photosensor of the display panel will be described with reference to a timing chart of FIG. 4. In FIG. 4, a signal 401 corresponds to the potential of the photodiode reset signal line 208 in FIG. 2, a signal 402 corresponds to the potential of the reading signal line 209 in FIG. 2 to which the gate of the transistor 206 is connected, a signal 403 corresponds to the potential of a gate signal line 213 in FIG. 2 to which the gate of the transistor 205 is connected, and a signal 404 corresponds to the potential of the photosensor output signal line 211 in FIG. 2. Further, a signal 405 corresponds to the potential of the precharge signal line 303 in FIG. 3.

At a time A, when the potential of the photodiode reset signal line 208 (the signal 401) is set to "H" (reset operation), the photodiode 204 is in a conducting state and the potential of the gate signal line 213 (the signal 403) to which the gate of the transistor 205 is connected becomes "H". Further, when the potential of the precharge signal line 303 (the signal 405) is set to "L", the potential of the photosensor output signal line 211 (the signal 404) is precharged to "H".

At a time B, when the potential of the photodiode reset signal line 208 (the signal 401) is set to "L" (accumulating operation), the potential of the gate signal line 213 (the signal 403) to which the gate of the transistor 205 is connected begins to be lowered due to the off current of the photodiode 204. The off current of the photodiode 204 increases when light is delivered thereto; therefore, the potential of the gate signal line 213 (the signal 403) to which the gate of the transistor 205 is connected varies in accordance with the amount of the light delivered to the photodiode 204. That is, current between a source and a drain of the transistor 205 varies.

At a time C, when the potential of the reading signal line 209 (the signal 402) is set to "H" (selecting operation), the transistor 206 is turned on and the photosensor reference signal line 212 and the photosensor output signal line 211 establish electrical continuity through the transistor 205 and the transistor 206. Then, the potential of the photosensor output signal line 211 (the signal 404) is lowered. Note that previous to the time C, the potential of the precharge signal line 303 (the signal 405) is set to "H" and the precharge of the photosensor output signal line 211 is completed. Here, a speed with which the potential of the photosensor output signal line 211 (the signal 404) is lowered depends on the source-drain current of the transistor 205. That is, the speed with which the potential of the photosensor output signal line 211 varies in accordance with the amount of light delivered to the photodiode 204.

At a time D, when the potential of the reading signal line 209 (the signal 402) is set to "L", the transistor 206 is turned off, and the potential of the photosensor output signal line 211 (the signal 404) has a constant value after the time D. Here, the value as the constant value varies in accordance with the amount of light delivered to the photodiode 204. Therefore, the amount of light delivered to the photodiode 204 can be found by obtaining the potential of the photosensor output signal line 211.

As described above, operation of individual photosensors is realized by repeating reset operation, accumulating operation, and selecting operation. Reset operation, accumulating operation, and selecting operation are performed on all of the pixels in the display device, so that imaging a contact object or a contactless object can be realized.

When reflection light from an object is weak, the object may be detected by judging whether external light enters a photosensor or not or whether the object shields external light, that is, makes a shadow or not. The object may be detected by reflection light and external light.

Note that in general, it is more difficult for a photosensor to detect a contactless object than to detect a contact object. That is because in the case where reflection of light delivered from the display device is detected with a photosensor, the amount of reflection light from the object drastically decreases as the object is moved away from the display device; therefore, it becomes difficult to distinguish brightness and darkness sharply. Further, in the case where entering or shielding of external light is detected with a photosensor, a shade becomes thin by diffraction of light as the object is moved away from the display device; therefore, it becomes difficult to distinguish between brightness and darkness sharply.

Accordingly, in order that a contact object and a contactless object are detected, it is effective that the sensitivity of a photosensor with respect to the amount of light is made to be variable and each object to be detected is detected with appropriate sensitivity. For example, in a structure in FIG. 2, potentials (the potentials of the photodiode reset signal line 208, the reading signal line 209, the photosensor reference signal line 212, and the precharged signal line 303) applied to a photosensor are changed, so that the sensitivity with respect to the amount of light can be variable. Specifically, as an example of a method for improving the sensitivity, a voltage applied to the photodiode 204 may be made to increase by an increase of the potential of the photodiode reset signal line 208. Further, it is also effective that a voltage applied between the source and drain of the transistor 205 may be made to increase by an increase of the potential difference between the potential of the photosensor reference signal line 212 and the potential of the precharged signal line 303.

Further, a period for accumulating operation in a photosensor is changed, so that the sensitivity with respect to the amount of light can be variable. For example, in a structure in FIG. 2, time for accumulating operation is made to be longer, so that time for accumulating light becomes longer; therefore, the sensitivity can be enhanced. Note that in the case of a contactless object, it is difficult to distinguish between brightness and darkness as compared to the case of a contact object; therefore, the sensitivity can be enhanced by a long accumulating operation. The above methods are combined with each other and employed, so that the sensitivity can be more strictly adjusted.

Note that the setting of the photosensor is regularly changed into a first setting which is appropriate for detection of a contact object or a second setting which is appropriate for detection of a contactless object. Data obtained by the photosensor in the first setting is used as data of the contact object. Data obtained by the photosensor in the second setting is used as data of the contactless object. The sensitivity of the photosensor is regularly changed in such a manner, so that it is possible to detect an object in both cases: the case where the object touches the display panel and the case where the object does not touch the display panel.

Figure 5:
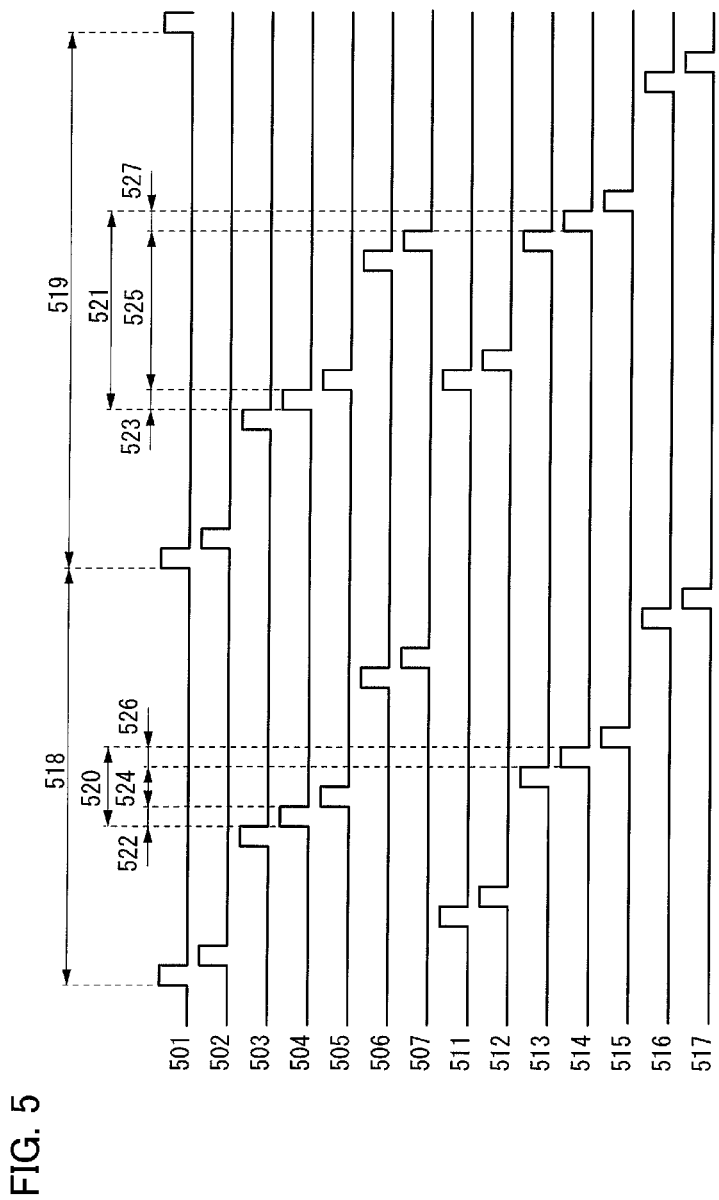
FIG. 5 is a timing chart.

A driving method illustrated in a timing chart of FIG. 5 can be used for all of the photosensor in the display panel in order that the sensitivity of a photosensor may be regularly changed as described above. In the timing chart of FIG. 5, a signal 501, a signal 502, a signal 503, a signal 504, a signal 505, a signal 506, and a signal 507 correspond to the potentials of the photodiode reset signal lines 208 in a first row, a second row, a (m−1)-th row, an in-th row, an (m+1)-th row, an (n−1)-th row, and an n-th row, respectively. In addition, in the timing chart, a signal 511, a signal 512, a signal 513, a signal 514, a signal 515, a signal 516, and a signal 517 correspond to the potentials of the reading signal lines 209 in a first row, a second row, a (m−1)-th row, an m-th row, an (m+1)-th row, an (n−1)-th row, and an n-th row, respectively. A period 518 and a period 519 are a period needed for one-time imaging in the first setting and a period needed for the second setting in a photosensor, respectively. Note that a period needed for one-time imaging of both the first setting and the second setting in the photosensor is the total of the periods 518 and 519. A period 520 and a period 521 are a period in which a photosensor in the m-th row operates in the first setting and a period in which a photosensor in the m-th row operates in the second setting in the photosensor, respectively. A period 522 and a period 523 are a period in which the photosensor in the m-th row performs the reset operation in the first setting in the photosensor and a period in which the photosensor in the m-th row performs the reset operation in the second setting in the photosensor, respectively. A period 524 and a period 525 are a period in which the photosensor in the m-th row performs the accumulating operation in the first setting in the photosensor and a period in which the photosensor in the m-th row performs the accumulating operation in the second setting in the photosensor, respectively. A period 526 and a period 527 are a period in which the photosensor in the m-th row performs the selecting operation in the first setting in the photosensor and a period in which the photosensor in the m-th row performs the selecting operation in the second setting in the photosensor, respectively.

Figure 6:
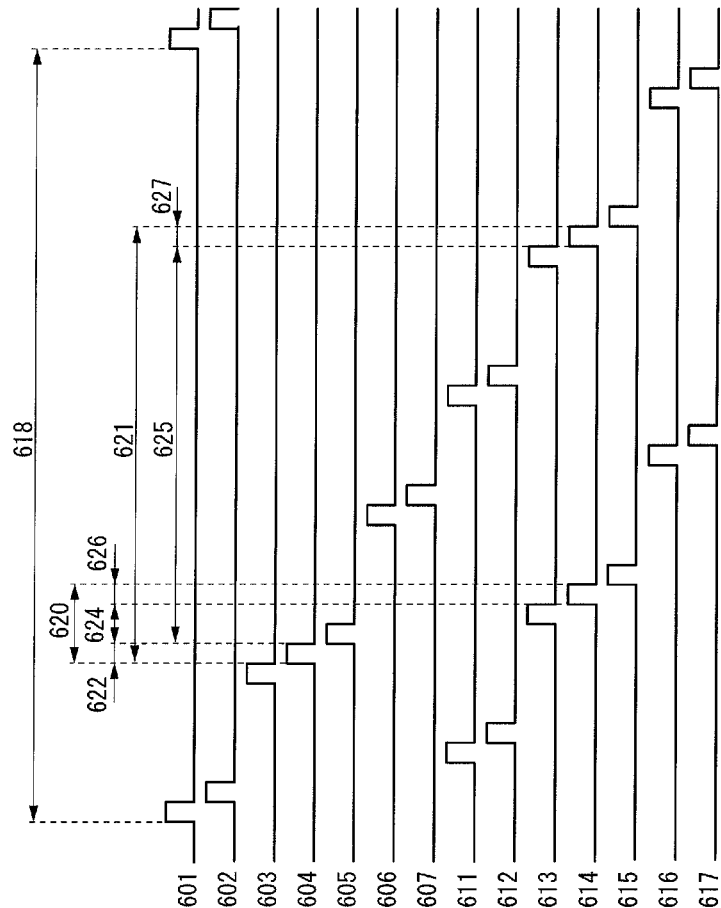
FIG. 6 is a timing chart.

Alternatively, a driving method illustrated in a timing chart of FIG. 6, which is different from that of FIG. 5, can be used for all of the photosensor in the display panel in order that the sensitivity of the photosensor may be regularly changed as described above. In the timing chart of FIG. 6, a signal 601, a signal 602, a signal 603, a signal 604, a signal 605, a signal 606, and a signal 607 correspond to the potentials of the photodiode reset signal lines 208 in the first row, the second row, the (m−1)-th row, the m-th row, the (m+1)-th row, the (n−1)-th row, and the n-th row, respectively. In addition, in the timing chart, a signal 611, a signal 612, a signal 613, a signal 614, a signal 615, a signal 616, and a signal 617 correspond to the potentials of the reading signal lines 209 in the first row, the second row, the (m−1)-th row, the m-th row, the (m+1)-th row, the (n−1)-th row, and the n-th row, respectively. A period 618 is a period needed for one-time imaging of both the first setting and the second setting in a photosensor. A period 620 and a period 621 are a period in which a photosensor in the m-th row operates in the first setting in the photosensor and a period in which a photosensor in the m-th row operates in the second setting in the photosensor, respectively. A period 622 is a period in which the photosensor in the m-th row performs the reset operation for both the first setting and the second setting in the photosensor. A period 624 and a period 625 are a period in which the photosensor in the m-th row performs the accumulating operation in the first setting in the photosensor and a period in which the photosensor in the m-th row performs the accumulating operation in the second setting in the photosensor, respectively. A period 626 and a period 627 are a period in which the photosensor in the m-th row performs the selecting operation in the first setting in the photosensor and a period in which the photosensor in the m-th row performs the selecting operation in the second setting in the photosensor, respectively.

In the timing chart of FIG. 6, the reset operation is performed once for both the first setting and the second setting of the photosensor, so that a period needed for imaging of both of the settings is shortened as compared to that of FIG. 5.

Therefore, the driving method illustrated in the timing chart of FIG. 6 is employed, so that high-speed imaging can be achieved.

Note that when the driving methods of FIG. 5 and FIG. 6 are used, although a dark portion of a contact object should be imaged only in the first setting, the dark portion can be also imaged in the second setting. Accordingly, it is possibly difficult to distinguish between the dark portion of the contact object and a contactless object. In such a case, the following method is effective: the outline of a contact object is extracted from an image imaged in the first setting by using known image processing; then, a region of the contact object is detected; further, the image imaged in the second setting in the region except the region of the contact object is used as the image of the contactless object.

By employing such a mode, the display device in which imaging a high-quality image can be performed at high speed on a contact object and in which a contactless object can be detected at high speed can be provided.

Note that the display device including a photosensor is described in this embodiment, and this embodiment can be easily applied to a semiconductor device including a photosensor. That is, the semiconductor device can be formed in such a manner that the display element 105 and a circuit needed for display, specifically the display device control circuit 102 are removed from the display device in this embodiment. As an example of the semiconductor device, an image sensor can be given. Such a semiconductor device can detect a contact object or an object being close to an input portion including a photosensor as above.

This embodiment can be implemented in combination with any of other embodiments and examples as appropriate.

Embodiment 2

Figure 7:
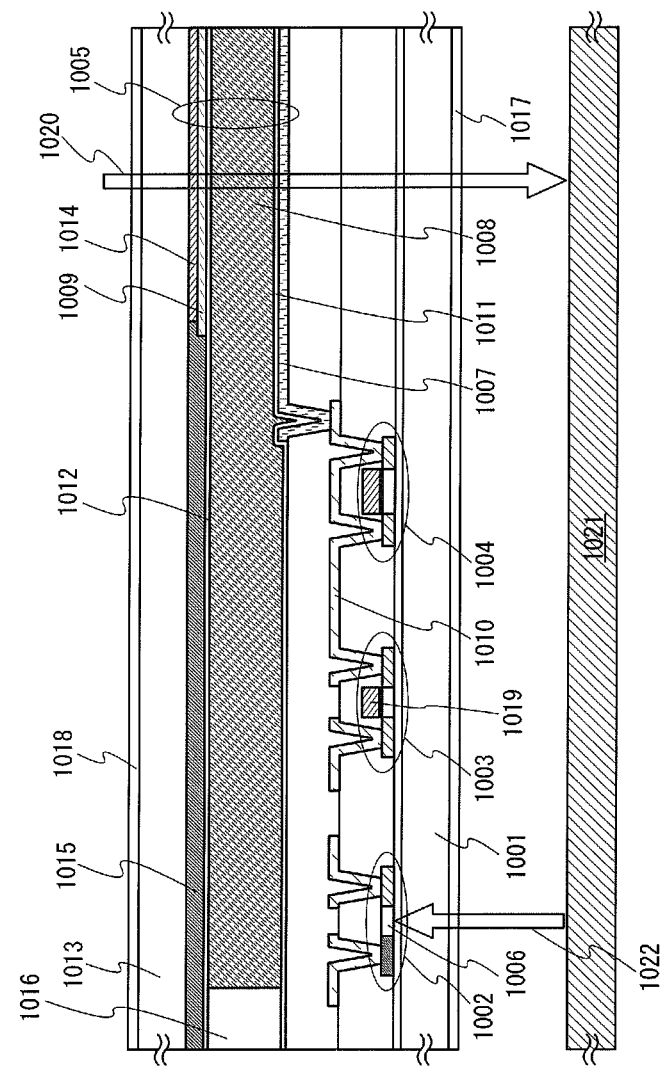
FIG. 7 is an explanatory cross-sectional view of a display device.

FIG. 7 illustrates an example of a cross-sectional view of the display panel. In the display panel in FIG. 7, a photodiode 1002, a transistor 1003, a storage capacitor 1004, and a liquid crystal element 1005 are provided over a substrate (TFT substrate) 1001 having an insulating surface.

The photodiode 1002 and the storage capacitor 1004 can be formed at the same time as the transistor 1003 is formed in a manufacturing process of the transistor 1003. The photodiode 1002 is a lateral junction pin diode. A semiconductor film 1006 included in the photodiode 1002 has a region having p-type conductivity (p-type layer), a region having i-type conductivity (i-type layer), and a region having n-type conductivity (n-type layer). Note that although the case where the photodiode 1002 is a pin diode is illustrated in this embodiment, the photodiode 1002 may be a pn diode. Lateral pin junction or lateral pn junction can be formed in such a manner that an impurity imparting p-type conductivity and an impurity imparting n-type conductivity is added to respective particular regions in the semiconductor film 1006.

Further, it is possible to form an island-shaped semiconductor film of the photodiode 1002 and an island-shaped semiconductor film of the transistor 1003 at the same time by processing (patterning) one semiconductor film formed over the TFT substrate 1001 in a desired shape by etching or the like; therefore, a step generally added to a panel manufacturing process is unnecessary, so that cost can be reduced.

Note that a stacked layer of the p-type layer, the i-type layer, and the n-type layer can be used instead of a lateral junction photodiode.

The liquid crystal element 1005 includes a pixel electrode 1007, liquid crystals 1008, and a counter electrode 1009. The pixel electrode 1007 is formed over the substrate 1001 and is electrically connected to the transistor 1003 through the storage capacitor 1004 and a conductive film 1010. Further, the counter electrode 1009 is formed over a substrate (a counter substrate), and the liquid crystal 1008 are sandwiched between the pixel electrode 1007 and the counter electrode 1009. Note that although a transistor used for a photosensor is not illustrated in this embodiment, the transistor can be formed over the substrate (TFT substrate) 1001 together with the transistor 1003 in the manufacturing process for the transistor 1003.

A cell gap between the pixel electrode 1007 and the counter electrode 1009 can be controlled by using a spacer 1016. Although the cell gap is controlled by the spacer 1016 which is selectively formed by photolithography and has a columnar shape in FIG. 7, the cell gap can alternatively be controlled by sphere spacers dispersed between the pixel electrode 1007 and the counter electrode 1009.

Further, between the substrate (TFT substrate) 1001 and the substrate (the counter substrate) 1013, the liquid crystal 1008 is surrounded by a sealing material. The liquid crystal 1008 may be injected by a dispenser method (droplet method) or a dipping method (pumping method).

For the pixel electrode 1007, a light-transmitting conductive material such as indium tin oxide (ITO), indium tin oxide containing silicon oxide (ITSO), organic indium, organic tin, zinc oxide, indium zinc oxide (IZO) containing zinc oxide, zinc oxide containing gallium, tin oxide, indium oxide containing tungsten oxide, indium zinc oxide containing tungsten oxide, indium oxide containing titanium oxide, indium tin oxide containing titanium oxide, or the like can be used.

In addition, since the light-transmitting liquid crystal element 1005 is given as an example, the above-described light-transmitting conductive material can be used also for the counter electrode 1009 as in the case of the pixel electrode 1007.

An alignment film 1011 is provided between the pixel electrode 1007 and the liquid crystal 1008 and an alignment film 1012 is provided between the counter electrode 1009 and the liquid crystal 1008. The alignment film 1011 and the alignment film 1012 can be formed using an organic resin such as polyimide or polyvinyl alcohol. An alignment treatment such as rubbing is performed on their surfaces in order to align liquid crystal molecules in certain direction. Rubbing can be performed by rolling a roller wrapped with cloth of nylon or the like while applying pressure on the alignment film so that the surface of the alignment film is rubbed in certain direction. Note that by using an inorganic material such as silicon oxide, the alignment film 1011 and the alignment film 1012 each having an alignment property can be directly formed by evaporation method without performing an alignment treatment.

Further, a color filter 1014 capable of transmitting light with a particular wavelength is formed over the substrate (counter substrate) 1013 so as to overlap with the liquid crystal element 1005. The color filter 1014 can be selectively formed by photolithography after an organic resin such as an acrylic-based resin in which pigment is dispersed is applied on the substrate 1013. Alternatively, the color filter 1014 can be selectively formed by etching after a polyimide-based resin in which pigment is dispersed is applied on the substrate 1013. Alternatively, the color filter 1014 can be selectively formed by a droplet discharge method such as an ink jet method.

Further, a shielding film 1015 capable of shielding light is formed on the substrate (the counter substrate) 1013 so as to overlap with the photodiode 1002. The shielding film 1015 not only prevents light from the backlight that passes through the substrate (counter substrate) 1013 and enters the display panel from directly being delivered to the photodiode 1002, but also prevents disclination due to incorrect alignment of the liquid crystals 1008 between the pixels from being identified visually. An organic resin containing black pigment such as carbon black or low-order titanium oxide can be used for the shielding film 1015. Alternatively, a film of chromium can be used for the shielding film 1015.

Further, a polarizing plate 1017 is formed on the opposite side of the substrate (the TFT substrate) 1001 over which the pixel electrode 1007 is formed, and a polarizing plate 1018 is formed on the opposite side of the substrate (the counter substrate) 1013 over which the counter electrode 1009 is formed.

The liquid crystal element may be a TN (twisted nematic) mode, a VA (vertical alignment) mode, an OCB (optically compensated birefringence) mode, an IPS (in-plane switching) mode, or the like. Note that although an example of the liquid crystal element 1005 in which the liquid crystals 1008 are sandwiched between the pixel electrode 1007 and the counter electrode 1009 is illustrated in this embodiment, the display panel in one embodiment of the present invention is not limited to this structure. A liquid crystal element in which a pair of electrodes is formed on the substrate (TFT substrate) 1001 side, which is similar to an IPS mode liquid crystal element, may also be used.

In addition, although an example in which a thin semiconductor film is used for the photodiode 1002, the transistor 1003, and the storage capacitor 1004 is illustrated in this embodiment, a single crystal semiconductor substrate, an SOI substrate, or the like can be used for the photodiode 1002, the transistor 1003, and the storage capacitor 1004.

Light from the backlight is delivered from the substrate (counter substrate) 1013 side. That is, light from the backlight passes through the liquid crystal element 1005 and is delivered to an object 1021 on the substrate (TFT substrate) 1001 side as shown by an arrow 1020. Then, light shown by the arrow 1022 and reflected off the object 1021 enters the photodiode 1002.

In addition, in the case where external light is detected, the external light is delivered from the substrate (TFT substrate) 1001 side. Since the object 1021 shields the external light, incident light on the photodiode 1002 is shielded. That is, the photodiode 1002 detects the shadow of the object.

By employing such a mode, a display panel in which data can be input by detection of the movement of a contactless object can be provided.

Further, the display device of this embodiment can detect an object also in the case where the object is close to the display panel. The distance between the object and the display panel can be equal to or less than 3 cm, which is effective for detection as compared to the case where a CCD image sensor or the like is provided.

Furthermore, in the display device of this embodiment, a light receiving surface of a photosensor (photodiode 1002) and the display surface of the display panel (substrate 1001 side) have the same direction. Therefore, an object can be imaged with the display panel, which is effective for imaging as compared to the case where a CCD image sensor or the like is provided.

This embodiment can be implemented in combination with any of other embodiments and examples as appropriate.

Embodiment 3

Figure 8:
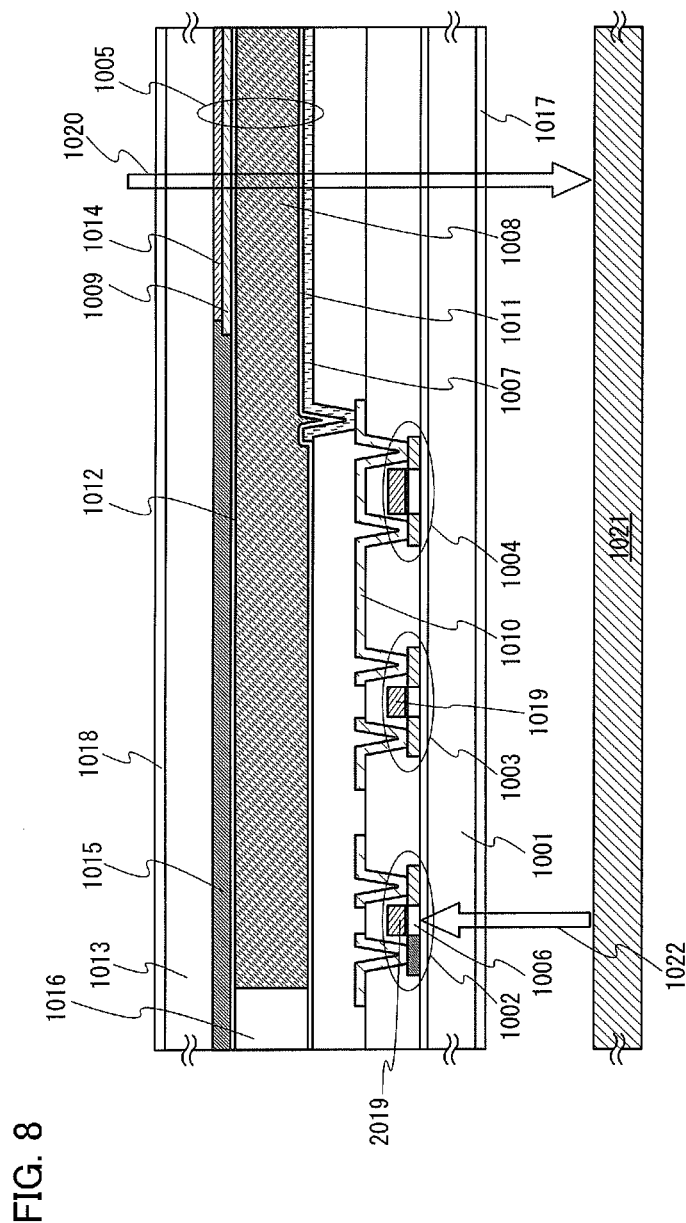
FIG. 8 is an explanatory cross-sectional view of a display device.

FIG. 8 illustrates an example of a cross-sectional view of a display panel different from that in Embodiment 2. In the display panel illustrated in FIG. 8, the photodiode 1002 differs from that in FIG. 7 in having a shielding film 2019 formed using a conductive film 1019 that is used for a gate electrode of the transistor 1003. By the shielding film in the photodiode 1002, light from the backlight can be prevented from directly entering a region that is intrinsic (i-type layer) and only light reflected off an object can be efficiently detected.

Further, in the case where the photodiode 1002 serves as a lateral pin diode, a region that has p-type conductivity (a p-type layer) and a region that has n-type conductivity (n-type layer) can be formed by self-aligned process using the shielding film as a mask. This is effective in manufacturing a small photodiode, in reducing the pixel size, and in improving the aperture ratio.

By employing such a mode, a display panel in which data can be input by detection of the movement of a contactless object can be provided.

Note that although a lateral junction photodiode is used in FIG. 8, a stacked layer of the p-type layer, the i-type layer, and the n-type layer can alternatively be used.

Note that this embodiment is the same as Embodiment 2 in respect of the incident light on the photodiode 1002, the distance between an object and the display panel, and the direction of a light receiving surface of a photosensor and the display surface of the display panel.

This embodiment can be implemented in combination with any of other embodiments and examples as appropriate.

Embodiment 4

Figure 9:
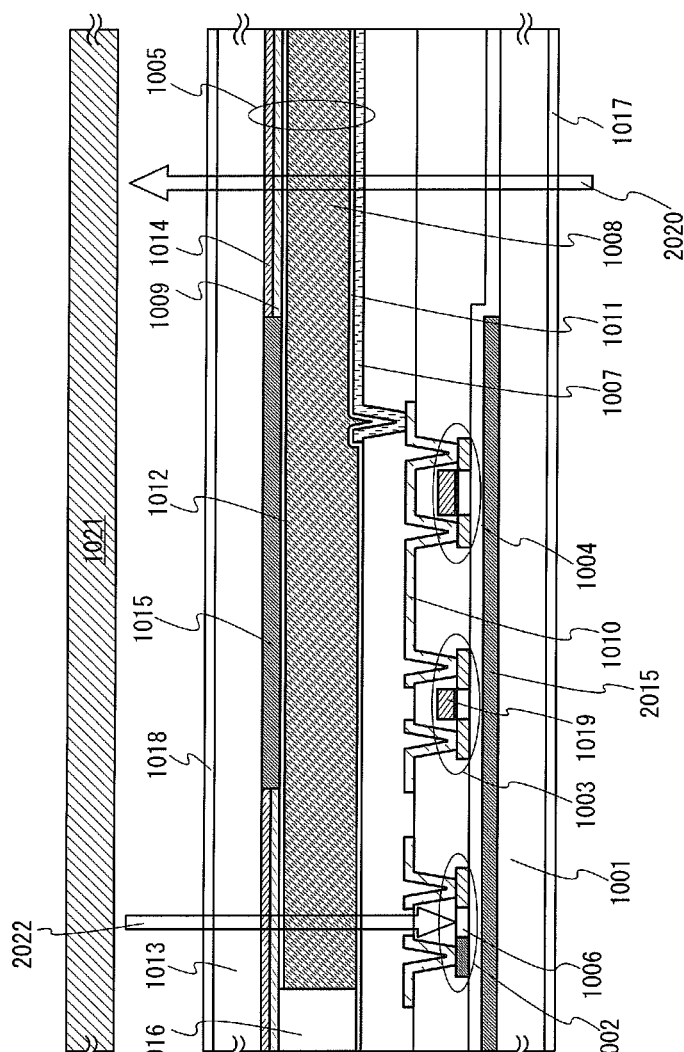
FIG. 9 is an explanatory cross-sectional view of a display device.

FIG. 9 illustrates another example of a cross-sectional view of a display panel different from that in Embodiment 2. The display panel in FIG. 9 is different from that in FIG. 7 in that light from the backlight is delivered from the substrate (TFT substrate) 1001 side. That is, light from the backlight passes through the liquid crystal element 1005 and is delivered to an object 1021 on the substrate (counter substrate) 1013 side as shown by an arrow 2020. Then, light shown by an arrow 2022 and reflected off the object 1021 enters the photodiode 1002. In this case, for example, an opening may be provided in the shielding film 1015 above the photodiode 1002 in order that light reflected off the object 1021 may enter the photodiode 1002.

In this embodiment, a shielding film 2015 is provided below the photodiode 1002. The shielding film 2015 prevents light from the backlight that passes through the substrate (TFT substrate) 1001 and which enters the display panel from directly being delivered the photodiode 1002, so that a display panel capable of imaging a high-resolution image can be provided. An organic resin containing black pigment such as carbon black or low-order titanium oxide can be used for the shielding film 2015. Alternatively, a film of chromium can be used for the shielding film 2015.

In the case where the photodiode 1002 detects infrared light, the color filter 1014 transmitting infrared light may be formed over the photodiode 1002. In that case, a stacked layer of color filters with different colors is preferably used.

Note that although a lateral-junction photodiode is used in FIG. 9, a stacked layer of the p-type layer, the i-type layer, and the n-type layer can be alternatively used.

In addition, in the case where external light is detected, the external light is delivered from the substrate (counter substrate) 1013 side. Since the object 1021 shields the external light, incident light on the photodiode 1002 is shielded. That is, the photodiode 1002 detects the shadow of the object.

Note that this embodiment is the same as Embodiment 2 in respect of the distance between an object and the display panel, and the directions of the light receiving surface of a photosensor (photodiode 1002) and the display surface of the display panel. The light receiving surface of the photosensor faces in the direction of the display surface of the display panel (substrate 1013), so that the object may be imaged with the display panel.

This embodiment can be implemented in combination with any of other embodiments and examples as appropriate.

Embodiment 5

An example of a writing board (such as a blackboard and a whiteboard) using a display panel having a photosensor will be described.

Figure 10:
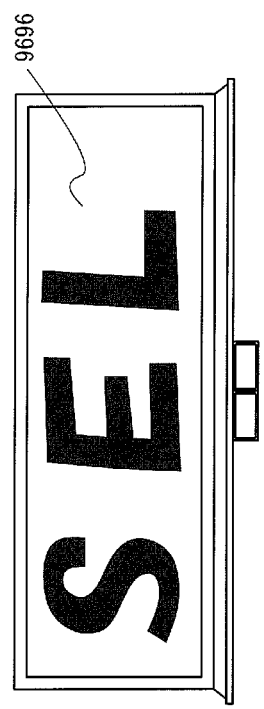
FIG. 10 is an example of an electronic device using a display device.

For example, the display panel including a photosensor is provided at the position of a display panel 9696 in FIG. 10.

The display panel 9696 has a photosensor and a display element.

Here, it is possible to write freely with a marker pen or the like on the surface of the display panel 9696.

Note that it is easy to erase letters if the letters are written with a marker pen or the like without fixer.

In addition, it is preferable that the surface of the display panel 9696 be adequately smooth in order that the ink of the marker pen may be easily removed.

The surface of the display panel 9696 has sufficient smoothness when a glass substrate or the like is used for the surface of the display panel 9696.

Alternatively, a transparent synthetic resin sheet or the like may be attached to the surface of the display panel 9696.

Acrylic resin, for example, is preferably used as the synthetic resin. In this case, the surface of the sheet of synthetic resin is preferably smooth.

Since the display panel 9696 has the display element, a particular image can be displayed on the display panel 9696 and something can be written with the marker pen on the surface of the display panel 9696.

Further, the display panel 9696 has the photosensor, so that letters written with the marker pen can be read and printed out if the display panel 9696 is connected to a printer or the like.

Further, since the display panel 9696 has the photosensor and the display element, by writing text, drawing figures, or the like on the surface of the display panel 9696 with an image displayed, a trail of the marker pen read by the photosensor and the image can be synthesized and displayed on the display panel 9696.

Note that sensing with resistive touch sensors, capacitive touch sensors, or the like can be performed only at the same time as writing with a marker pen or the like.

On the other hand, sensing with a photosensor is superior in that sensing can be performed anytime after something is written with a marker or the like, even if time has passed.

This embodiment can be implemented in combination with any of other embodiments and examples as appropriate.

Example 1

Figure 11:
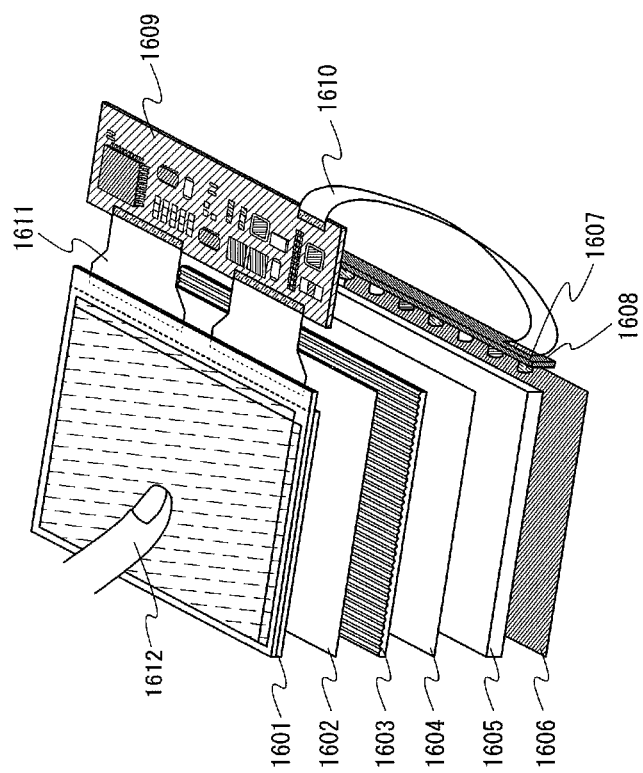
FIG. 11 is an explanatory diagram of a structure of a display device.

In Example 1, positions of a panel and a light source will be described. FIG. 11 is an example of a perspective view illustrating a structure of a display panel. The display panel illustrated in FIG. 11 includes a panel 1601 in which a pixel including a liquid crystal element, a photodiode, a thin film transistor, and the like is formed between a pair of substrates; a first diffuser plate 1602; a prism sheet 1603; a second diffuser plate 1604; a light guide plate 1605; a reflector plate 1606; a backlight 1608 including a plurality of light sources 1607; and a circuit board 1609.

The panel 1601, the first diffuser plate 1602, the prism sheet 1603, the second diffuser plate 1604, the light guide plate 1605, and the reflector plate 1606 are stacked in this order. The light sources 1607 are provided at an end portion of the light guide plate 1605. Light from the light sources 1607 diffused into the light guide plate 1605 is uniformly delivered from the counter substrate side to the panel 1601 with the help of the first diffuser plate 1602, the prism sheet 1603, and the second diffuser plate 1604.

Note that although the first diffusing plate 1602 and the second diffusing plate 1604 are used in Example 1, the number of diffusing plates is not limited thereto. The number of diffusing plates may be one, or may be three or more. The diffuser plate may be provided between the light guide plate 1605 and the panel 1601. Therefore, the diffuser plate may be provided only on the side closer to the panel 1601 than the prism sheet 1603, or may be provided only on the side closer to the light guide plate 1605 than the prism sheet 1603.

Further, the shape of the cross section of the prism sheet 1603, which is illustrated in FIG. 11, is not limited to a serrate shape; the shape may be a shape with which light from the light guide plate 1605 can be gathered to the panel 1601 side.

The circuit board 1609 is provided with a circuit for generating or processing various signals to be input to the panel 1601, a circuit for processing various signals to be output from the panel 1601, and the like. In addition, in FIG. 11, the circuit board 1609 and the panel 1601 are connected to each other through an FPC (flexible printed circuit) 1611. Note that the above circuit may be connected to the panel 1601 by a chip on glass (COG) method, or part of the above circuit may be connected to the FPC 1611 by a chip on film (COF) method.

FIG. 11 illustrates an example in which a control circuit for controlling the driving of the light sources 1607 is provided for the circuit board 1609, and the control circuit and the light sources 1607 are connected to each other through the FPC 1610. However, the above described control circuit may be formed over the panel 1601, and in that case, the panel 1601 and the light sources 1607 are made to be connected to each other through an FPC or the like.

Note that although FIG. 11 illustrates an edge-light type light source in which the light sources 1607 are provided on the edge of the panel 1601, a display panel according to one embodiment of the present invention may be a direct-below type display panel in which the light sources 1607 are provided directly below the panel 1601.

For example, when a finger 1612, an object, gets close to the panel 1601 from the TFT substrate side, part of light that passes through the panel 1601 from the backlight 1608 reflects off the finger 1612 and enters the panel 1601 again. Color image data of the finger 1612, the object, can be obtained by sequentially lighting the light sources 1607 that correspond to individual colors and obtaining image data of every color.

This embodiment can be implemented in combination with any of other embodiments and other examples as appropriate.

Example 2

A display device according to one embodiment of the present invention is characterized by obtaining image data with high resolution. Therefore, an electronic device using the display device according to one embodiment of the present invention can be equipped with a higher-functional application by adding the display device as a component. The display device of the present invention can be used for display devices, laptop computers, or image reproducing devices provided with recording media (typically, devices which reproduce the content of recording media such as DVDs (digital versatile discs), and have displays for displaying the reproduced images). In addition to the above examples, as an electronic device which include the display device according to one embodiment of the present invention, mobile phones, portable game machines, portable information terminals, e-book readers, video cameras, digital still cameras, goggle-type displays (head mounted displays), navigation systems, audio reproducing devices (e.g., car audio components and digital audio players), copiers, facsimiles, printers, multi-function printers, automated teller machines (ATM), vending machines, and the like can be given. Specific examples of such an electronic device are illustrated in FIGS. 12A to 12D.

Figure 12A:
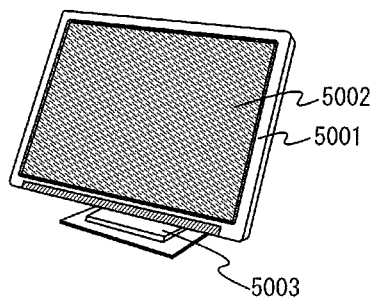
FIGS. 12A to 12D are examples of an electronic device using a display device.

FIG. 12A illustrates a display device including a housing 5001, a display portion 5002, a supporting base 5003, and the like. The display device according to one embodiment of the present invention can be used for the display portion 5002. The use of a display device according to one embodiment of the present invention for the display portion 5002 can provide a display device capable of obtaining image data with high resolution and capable of being equipped with higher-functional applications. Note that the display device includes all display devices for displaying information, such as display devices for personal computers, display devices for receiving TV broadcasts, and display devices for displaying advertisements.

Figure 12B:
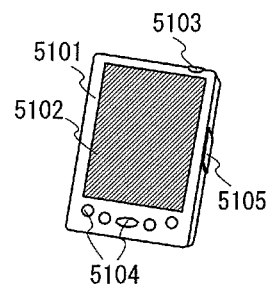

FIG. 12B illustrates a portable information terminal including a housing 5101, a display portion 5102, a switch 5103, operation keys 5104, an infrared rays port 5105, and the like. The display device according to one embodiment of the present invention can be used for the display portion 5102. The use of a display panel according to one embodiment of the present invention for the display portion 5102 can provide a portable information terminal capable of obtaining image data with high resolution and being equipped with higher-functional applications.

Figure 12C:
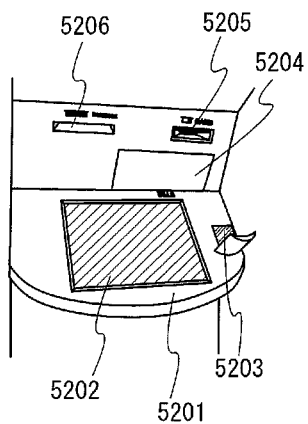

FIG. 12C illustrates an automated teller machine including a housing 5201, a display portion 5202, a coin slot 5203, a bill slot 5204, a card slot 5205, a bankbook slot 5206, and the like. The display device according to one embodiment of the present invention can be used for the display portion 5202. The use of the display device according to one embodiment of the present invention for the display portion 5202 can provide an automated teller machine capable of obtaining image data with high resolution and being equipped with higher-functional applications. The automated teller machine using the display device according to one embodiment of the present invention can read information of living body such as a finger print, a face, a handprint, a palm print, a pattern of a hand vein, an iris, and the like which are used for biometrics with higher accuracy. Therefore, a false non-match rate which is caused by false recognition of a person to be identified as a different person and a false acceptance rate which is caused by false recognition of a different person as a person to be identified can be suppressed.

Figure 12D:
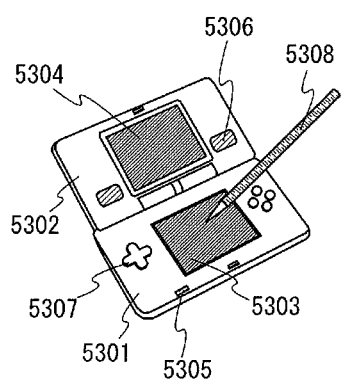

FIG. 12D illustrates a portable game machine including a housing 5301, a housing 5302, a display portion 5303, a display portion 5304, a microphone 5305, speakers 5306, an operation key 5307, a stylus 5308, and the like. The display device according to one embodiment of the present invention can be used for the display portion 5303 or the display portion 5304. The use of the display device according to one embodiment of the present invention for the display portion 5303 or the display portion 5304 can provide a portable game machine capable of obtaining image data with high resolution and being equipped with higher-functional applications. Note that although the portable game machine illustrated in FIG.

12D includes the two display portions 5303 and 5304, the number of display portions included in the portable game machine is not limited to two.

This embodiment can be implemented in combination with any of other embodiments and other examples as appropriate.

This application is based on Japanese Patent Application serial no. 2009-264625 filed with the Japan Patent Office on Nov. 20, 2009, the entire contents of which are hereby incorporated by reference.

What is claimed is:

1. A display device comprising:
   a display panel in which a photosensor is provided,
   wherein the display device comprises a function of detecting an object with the photosensor,
   wherein the photosensor is configured to perform a reset operation, an accumulating operation, and a selecting operation,
   wherein sensitivity of the photosensor is changed between a first setting for detecting an object which touches the display panel and a second setting for detecting an object which does not touch the display panel,
   wherein a duration of the accumulating operation in the second setting is longer than a duration of the accumulating operation in the first setting, and
   wherein the sensitivity of the photosensor is regularly changed between the first setting and the second setting.

2. The display device according to claim 1, wherein the sensitivity of the photosensor is changed by adjustment of voltage applied to the photosensor.

3. The display device according to claim 1,
   wherein the photosensor comprises a transistor and a photodiode which is electrically connected to a gate of the transistor, and
   wherein the sensitivity of the photosensor is changed by adjustment of voltage applied to the photodiode.

4. The display device according to claim 1,
   wherein the photosensor comprises a transistor and a photodiode which is electrically connected to a gate of the transistor, and
   wherein the sensitivity of the photosensor is changed by adjustment of voltage applied between a source and a drain of the transistor.

5. A semiconductor device comprising:
   an input portion in which a photosensor is provided,
   wherein the semiconductor device comprises a function of detecting an object with the photosensor,
   wherein the photosensor is configured to perform a reset operation, an accumulating operation, and a selecting operation,
   wherein sensitivity of the photosensor is changed between a first setting for detecting an object which touches the input portion and a second setting for detecting an object which does not touch the input portion,
   wherein a duration of the accumulating operation in the second setting is longer than a duration of the accumulating operation in the first setting, and
   wherein the sensitivity of the photosensor is regularly changed between the first setting and the second setting.

6. The semiconductor device according to claim 5, wherein the sensitivity of the photosensor is changed by adjustment of voltage applied to the photosensor.

7. The semiconductor device according to claim 5,
   wherein the photosensor comprises a transistor and a photodiode which is electrically connected to a gate of the transistor, and
   wherein the sensitivity of the photosensor is changed by adjustment of voltage applied to the photodiode.

8. The semiconductor device according to claim 5,
   wherein the photosensor comprises a transistor and a photodiode which is electrically connected to a gate of the transistor, and
   wherein the sensitivity of the photosensor is changed by adjustment of voltage applied between a source and a drain of the transistor.

9. The display device according to claim 1,
   wherein a photosensor control circuit controls the photosensor, and
   wherein the sensitivity of the photosensor is changed by adjustment of voltage applied to the photosensor.

10. The semiconductor device according to claim 5,
    wherein a photosensor control circuit controls the photosensor, and
    wherein the sensitivity of the photosensor is changed by adjustment of voltage applied to the photosensor.

11. A display device comprising:
    a display panel in which a photosensor is provided,
    wherein the display device comprises a function of detecting an object with the photosensor,
    wherein the photosensor is configured to perform a reset operation, an accumulating operation, and a selecting operation,
    wherein sensitivity of the photosensor is changed between a first setting for detecting an object which touches the display panel and a second setting for detecting an object which does not touch the display panel,
    wherein a duration of the accumulating operation in the second setting is longer than a duration of the accumulating operation in the first setting,
    wherein the reset operation in the first setting and the second setting are performed concurrently, and
    wherein in a period, the accumulating operation in the first setting and the second setting are performed concurrently.

12. A semiconductor device comprising:
    an input portion in which a photosensor is provided,
    wherein the semiconductor device comprises a function of detecting an object with the photosensor,
    wherein the photosensor is configured to perform a reset operation, an accumulating operation, and a selecting operation,
    wherein sensitivity of the photosensor is changed between a first setting for detecting an object which touches the input portion and a second setting for detecting an object which does not touch the input portion,
    wherein a duration of the accumulating operation in the second setting is longer than a duration of the accumulating operation in the first setting,
    wherein the reset operation in the first setting and the second setting are performed concurrently, and
    wherein in a period, the accumulating operation in the first setting and the second setting are performed concurrently.

13. The display device according to claim 1,
    wherein an outline of the object which touches the display panel is extracted from an image obtained in the first setting so as to detect the object which touches the display panel in a first region, and
    wherein in an image obtained in the second setting, a second region except the first region is used as an image of the object which does not touch the display panel.

14. The semiconductor device according to claim 5,
    wherein an outline of the object which touches the input portion is extracted from an image obtained in the first setting so as to detect the object which touches the input portion in a first region, and wherein in an image obtained in the second setting, a second region except the first region is used as an image of the object which does not touch the input portion.

15. The display device according to claim 11, wherein an outline of the object which touches the display panel is extracted from an image obtained in the first setting so as to detect the object which touches the display panel in a first region, and wherein in an image obtained in the second setting, a second region except the first region is used as an image of the object which does not touch the display panel.

16. The semiconductor device according to claim 12, wherein an outline of the object which touches the input portion is extracted from an image obtained in the first setting so as to detect the object which touches the input portion in a first region, and wherein in an image obtained in the second setting, a second region except the first region is used as an image of the object which does not touch the input portion.

* * * * *